US005886911A

United States Patent [19]
Yang

[11] Patent Number: 5,886,911
[45] Date of Patent: Mar. 23, 1999

[54] FAST CALCULATION METHOD AND ITS HARDWARE APPARATUS USING A LINEAR INTERPOLATION OPERATION

[75] Inventor: Ming-jer Yang, Hsinchu, Taiwan

[73] Assignee: Winbond Electronics Corp., Taiwan

[21] Appl. No.: 790,502

[22] Filed: Jan. 29, 1997

[51] Int. Cl.[6] ........................................... G06F 1/02
[52] U.S. Cl. ............................................... 364/723
[58] Field of Search ........................... 235/152, 151.11, 235/151.31; 364/169, 723, 480

[56] References Cited

U.S. PATENT DOCUMENTS

| | | | |
|---|---|---|---|
| 3,544,775 | 12/1970 | Bergland | 235/151.31 |
| 3,748,447 | 7/1973 | Hajicek et al. | 235/152 |
| 3,969,615 | 7/1976 | Bowers et al. | 235/151.11 |
| 4,558,422 | 12/1985 | DenBeste et al. | 364/480 |
| 4,581,698 | 4/1986 | Jaswa | 364/169 |
| 5,020,014 | 5/1991 | Miller et al. | 364/723 |

*Primary Examiner*—Ayaz R. Sheikh
*Assistant Examiner*—Omar A. Omar
*Attorney, Agent, or Firm*—Dellett and Walters

[57] ABSTRACT

The present invention relates to a fast calculation method and, more particularly, to a fast calculation method and its hardware apparatus using a linear interpolation operation. Primarily, the two existing values of the two given points X and Y intended to proceed the linear interpolation operation are stored in two registers A and B respectively, and then they are added through an adder and the lowest order bit of the sum is discarded to form a mean value. The resulting value discarded from the lowest order bit is then sent to a multiplexer and every bit in the binary representation of the position pointer K is sent to a selection input terminal of the multiplexer in sequence from the highest order bit to the lowest order bit. The resulting value discarded from the lowest order bit is sent back to either one of the two registers A and B in accordance with the digit of the corresponding bit in the binary representation of the position pointer K. The process described above will be repeated several times until the lowest order bit in the binary representation of the position pointer K is sent and finally, the interpolation value of the target point I is one of the resulting values discarded from the lowest order bit stored in the two registers A and B with the least error.

11 Claims, 6 Drawing Sheets

| K=11001 BINARY REPRESENTATION OF THE POSITION POINTER K | INITIAL VALUE | REGISTER A | REGISTER B |
|---|---|---|---|
| | | X | Y |
| $K_5 = 1$ | | $\frac{X+Y}{2}$ | Y |
| $K_4 = 1$ | | $\frac{X+3Y}{4}$ | Y |
| $K_3 = 0$ | | $\frac{X+3Y}{4}$ | $\frac{X+7Y}{8}$ |
| $K_2 = 0$ | | $\frac{X+3Y}{4}$ | $\frac{3X+13Y}{16}$ |
| $K_1 = 1$ | | $\frac{7X+25Y}{32}$ | $\frac{3X+13Y}{16}$ |

FIG. 6

| INITIAL VALUE | REGISTER A | REGISTER B |
|---|---|---|
| | $X$ | $Y$ |
| $K_6 = 0$ | $X$ | $\frac{X+Y}{2}$ |
| $K_5 = 1$ | $\frac{3X+Y}{4}$ | $\frac{X+Y}{2}$ |
| $K_4 = 0$ | $\frac{3X+Y}{4}$ | $\frac{5X+3Y}{8}$ |
| $K_3 = 0$ | $\frac{3X+Y}{4}$ | $\frac{11X+5Y}{16}$ |
| $K_2 = 1$ | $\frac{23X+9Y}{32}$ | $\frac{11X+5Y}{16}$ |
| $K_1 = 1$ | $\frac{45X+19Y}{64}$ | $\frac{11X+5Y}{16}$ |

K=010011 BINARY REPRESENTATION OF THE POSITION POINTER K

FIG. 7

FAST CALCULATION METHOD AND ITS HARDWARE APPARATUS USING A LINEAR INTERPOLATION OPERATION

BACKGROUND OF THE INVENTION

The present invention relates to a fast calculation method and, more particularly, to a fast calculation method and its hardware apparatus using a linear interpolation operation to reduce the complexity of the hardware and increase the speed of the calculation.

The ways for processing signals in devices such as computers, processors and the like are divided into two categories, one is an analog signal processing for continuous signals and the other one is a digital signal processing for discrete signals. The digital signal processing is selected more frequently than the analog signal processing since the digital signal processing can directly perform a complicated mathematical operation on signal values, greatly increasing the operative flexibility thereof. A digital signal is a combination of discrete sampling values obtained from sampling an analog signal in a fixed sampling frequency. Therefore, digital signals will become more analytical by picking a value between two sampling values through an interpolation operation.

The interpolation operation can be either simple or complicated, depending on which kind of the interpolation operation has been taken. The simplest one is a zero-order interpolation operation which regards a target point, that is, an interpolation value, as the first one of the two sampling points. Although the zero-order interpolation operation is very simple because what the zero-order interpolation operation needs to do is merely duplicate the first sampling point of the two rather than performing any computation, a lot of quantized noise signals will be introduced and thus, the quality of the interpolation operation is poor. A more useful interpolation operation is a linear interpolation operation which considers the relation between two sampling points to be linear and the target point will be obtained through a proportional computation. The linear interpolation operation becomes the most commonly chosen method because the computation amount of the linear interpolation operation is not too much but the effect in reducing the quantized noise signals is remarkable.

To raise the analytic degree of a signal and to reduce the quantized noise signal, adding a linear interpolation function into a circuit will without doubt increase the complexity of the circuit. For example, obtaining a target point I between a point X and a point Y, as shown in FIG. 1, the operations including an addition, a subtraction, multiplications and a division have to be taken in the following expression.

$$I=\{[(16-K)*X]+(K*Y)\}/16$$

When the expression described above is implemented by a hardware, the following two problems will be faced.

(1) In the event that a signal X and a signal Y are quantized and encoded to data with 8 bits, expressions of $[(16-K)*X]$ and $(K*Y)$ can be operated through a multiplier with a dimension of 8 bits by 4 bits. But operations in such a way will increase the complexity of the circuit and the manufacturing cost by a wide margin. Moreover, a modified design will be required by changing the multiplier with a dimension of 8 bits by 4 bits to a multiplier with a dimension of 8 bits by 5 bits or 8 bits by 6 bits if linear interpolation operations of dividing into 32 equal parts, 64 equal parts, and so on are further to be taken.

(2) In the event of merely substituting an adder for a multiplier, the expressions of $[(16-K)*X]$ and $(K*Y)$ will require to repeat an accumulative addition operation 16 times in total to complete the entire operation. Operations in such a way are considerably time consuming and a counter has to be externally added to control the time the accumulative addition operates. Additionally, the times of repeating the accumulative addition operation have to be raised higher than 32 times, 64 times, and so on if linear interpolation operation of dividing into 32 equal parts, 64 equal parts, and so on are further to be taken.

SUMMARY OF THE INVENTION

Accordingly, an objective of the present invention is to provide a fast calculation method and its hardware apparatus using a linear interpolation operation to simultaneously solve both problems of the complexity in circuit and the time in operation described above.

According to one aspect of the present invention, there is provided a fast calculation method using a linear interpolation operation comprising steps of: a step of determining two existing values of two given points X and Y, and a number K regarded as a position pointer of a target point I; a step of storing the two existing values of the two given points X and Y intended to proceed the linear interpolation operation; a step of adding the two existing values of the two given points X and Y, and discarding the lowest order bit of the resulting value; a step of selectively substituting the resulting value discarded from the lowest order bit for one of the two existing values of the two given points X and Y in accordance with the digit of the highest order bit in a binary representation of the position pointer K; a step of repeating the previous two steps until the lowest order bit in the binary representation of the position pointer K is used; and a step of achieving the interpolation value of the target point I from one of the two resulting values discarded from the lowest order bit of the two given points X and Y.

According to another aspect of the present invention, there is provided a hardware apparatus using a linear interpolation operation comprising: two registers for storing two existing values of two given points X and Y intended to proceed the linear interpolation operation; an adder for adding those existing values stored in two registers and discarding the lowest order bit of the resulting value to form a mean value, that is, achieving an effect of being divided by two; and a multiplexer for selectively substituting the mean value coming from the adder for one of the two existing values stored in these registers in accordance with the digit of the corresponding bit in the binary representation of the position pointer K, wherein the interpolation value of the target point I is one of the two mean values stored in these registers after the lowest order bit in the binary representation of the position pointer K is used.

BRIEF DESCRIPTION OF THE DRAWINGS

The above objective, other features and advantages of the present invention will become more apparent by describing in detail a preferred embodiment thereof with reference to the attached drawings, in which:

FIG. 6 is a preferred embodiment of a hardware apparatus in accordance with the present invention; and FIG. 7 is another preferred embodiment of a hardware apparatus in accordance with the present invention.

DETAILED DESCRIPTION OF THE PREFERRED EMBODIMENT

Figure 1:
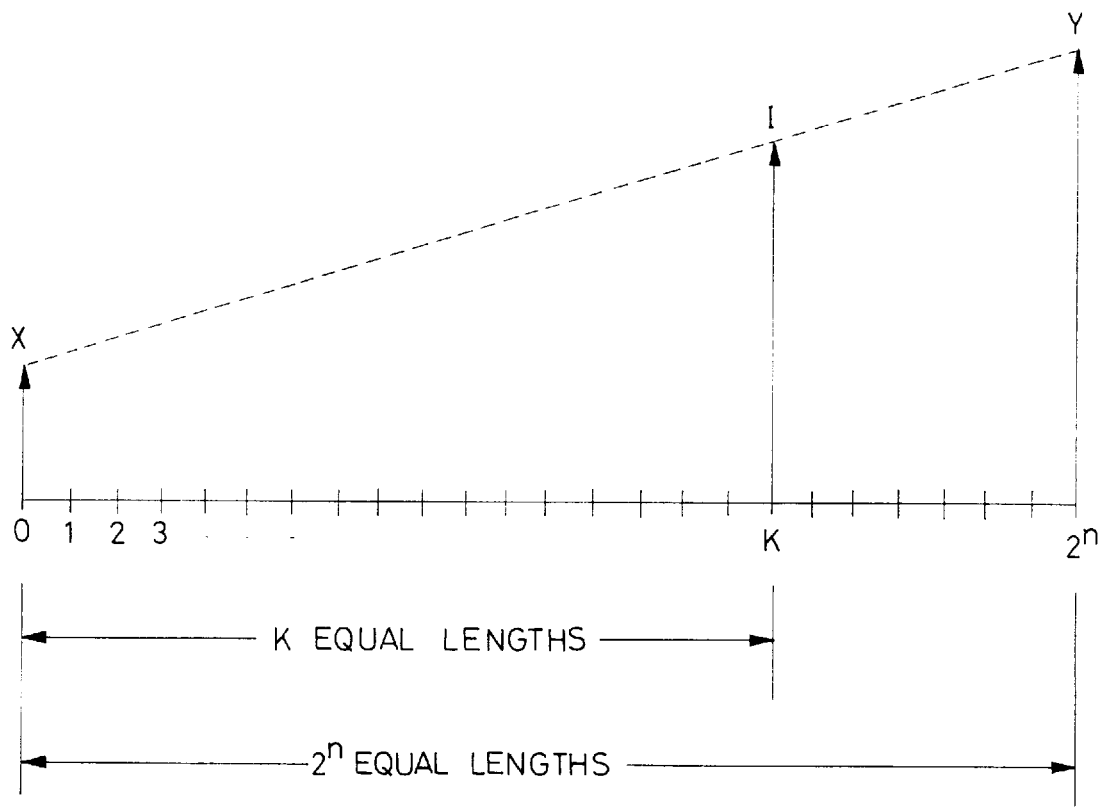
FIG. 1 is a schematic representation of a linear interpolation operation.

As shown in FIG. 1, there is a schematic representation of a linear interpolation operation, the distance between a given point X and a given point Y is divided into the n-th power of 2 equal lengths. The distance between a target point I and the given point X is equal to the summation of K equal lengths with a condition of $2^n-1 \geq K \geq 0$. Here, the number K is regarded as a position pointer of the target point I. The value of the number K is converted into n bits through a binary scale and a binary representation thereof is $[K]_2 = K_n K_{n-1} K_{n-2} \ldots K_2 K_1$, in which the $K_n$ is the highest order bit and $K_1$ is the lowest order bit. As a result, the expression $I = \{[(2^n-K)*X] + (K*)\}Y/2^n$ is referred to as a linear interpolation formula.

The linear interpolation method adopts a concept of a bisection method. The position where the target point I located will be gradually approached by sequentially referring to the digit of the corresponding bit in the binary representation of the position pointer K from the highest order bit to the lowest order bit, and then the interpolation value of the target point I is achieved.

Figure 3:
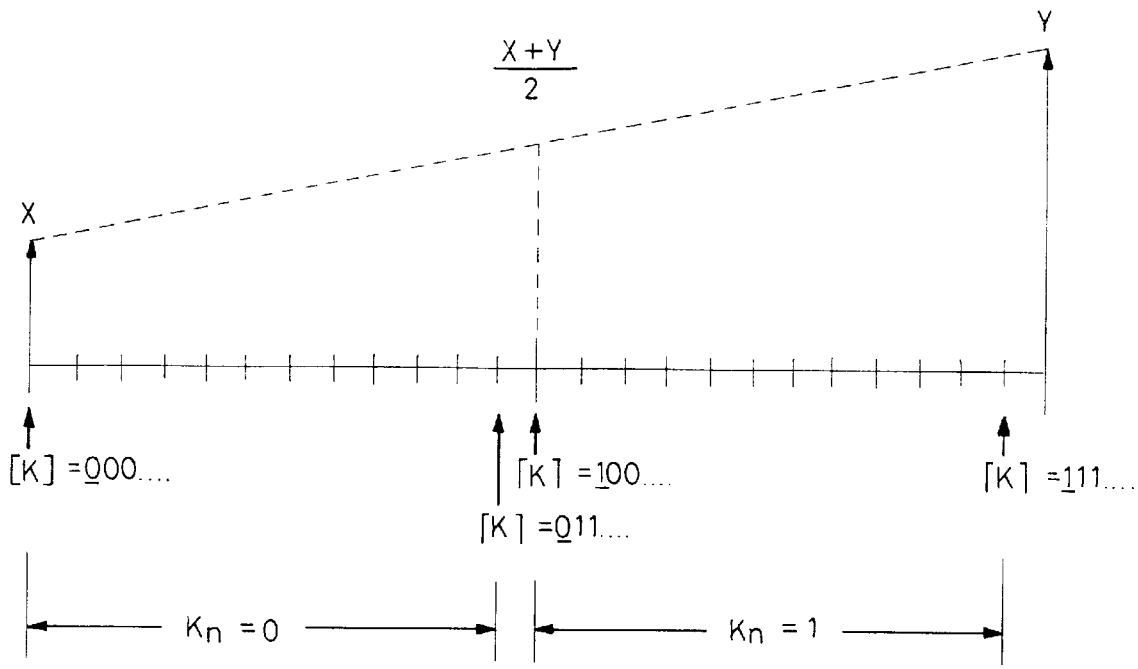
FIG. 3 is a schematic representation of applying a concept of a bisection method to gradually approach an interpolation value using an interpolation operation in a accordance with the present invention.

Because the number K is the position pointer of the point I, the position of the target point I will be affected by every bit in the binary representation of the number K to either come closer to or go farther from the position of the given point X. Taking the highest order bit $K_n$ in the binary representation of the number K for example, with reference to FIG. 3, the target point I must be located on the left side of the entire interval between the given point X and the given point Y if $K_n$ equals 0, and reversely, the target point I must be located on the right side of the entire interval between the given point X and the given point Y if $K_n$ equals 1. Similarly, with reference to FIG. 4, when $K_n$ equals 0, that is, the target point I is located within the interval between the given point X and a mid-point (X+Y)/2, the target point I must be positioned on the left side of the interval between the given point X and the mid-point (X+Y)/2 if $K_{n-1}$ equals 0 and the target point I must be positioned on the right side of the interval between the given point X and the mid-point (X+Y)/2. Reversely, when $K_n$ equals 1, that is, the target point I is located within the interval between the point (X+Y)/2 and the given point Y, the effect that $K_{n-1}$ generates will be in the same case as described above. How the position of the target point I will be affected by the other bits in the binary representation of the number K can be analogized in accordance with the principle described above.

Figure 5:
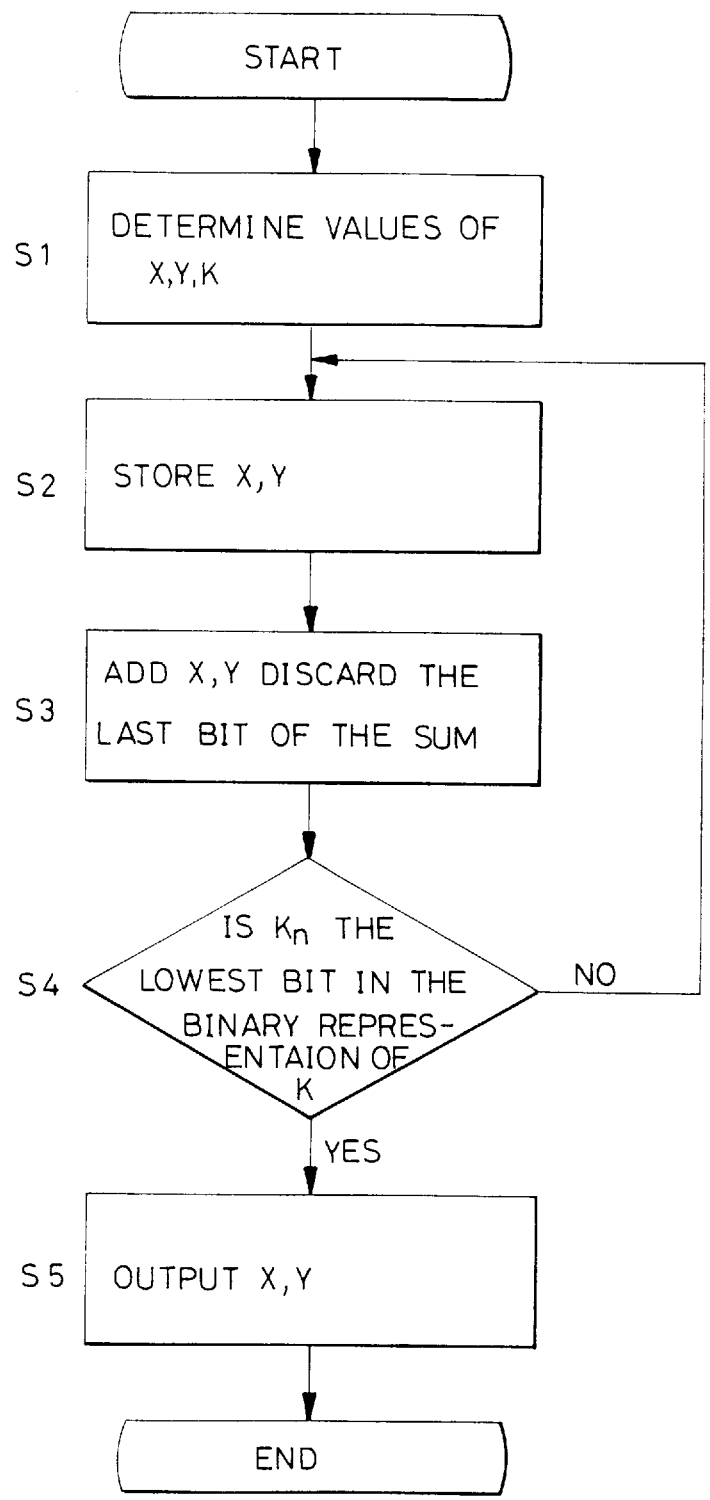
FIG. 5 is a flowchart showing the steps of applying the fast calculation method using the linear interpolation operation of the present invention.

Therefore, an interpolation value of a target point I can be achieved through applying a fast calculation method using a linear interpolation operation, and the steps are shown in FIG. 5.

Firstly, two existing values of two given points X and Y, and a number K regarded as a position pointer of the target point I is determined in step 1.

Next, the two existing values of the two given points X and Y intended to proceed the linear interpolation operation are stored in step 2.

Subsequently, the two existing values of the two given points X and Y are added, and the lowest bit of the resulting value is discarded in step 3.

Then, in step 4, the resulting value discarded from the lowest order bit will selectively substitute for one of the two existing values of the two given points X and Y in accordance with the highest order bit in the binary representation of the position pointer K, and the principle for substitution will depend on the larger difference of the two, one is the difference between the resulting value and the value of the given point X and the other one is between the resulting value and the value of the given point Y.

And then, the previous two steps will be repeated until the lowest order bit in the binary representation of the position pointer K is used.

Finally, in step 5, the interpolation value of the target point I is one of the final two resulting values stored depending on the substitution principle.

Figure 2:
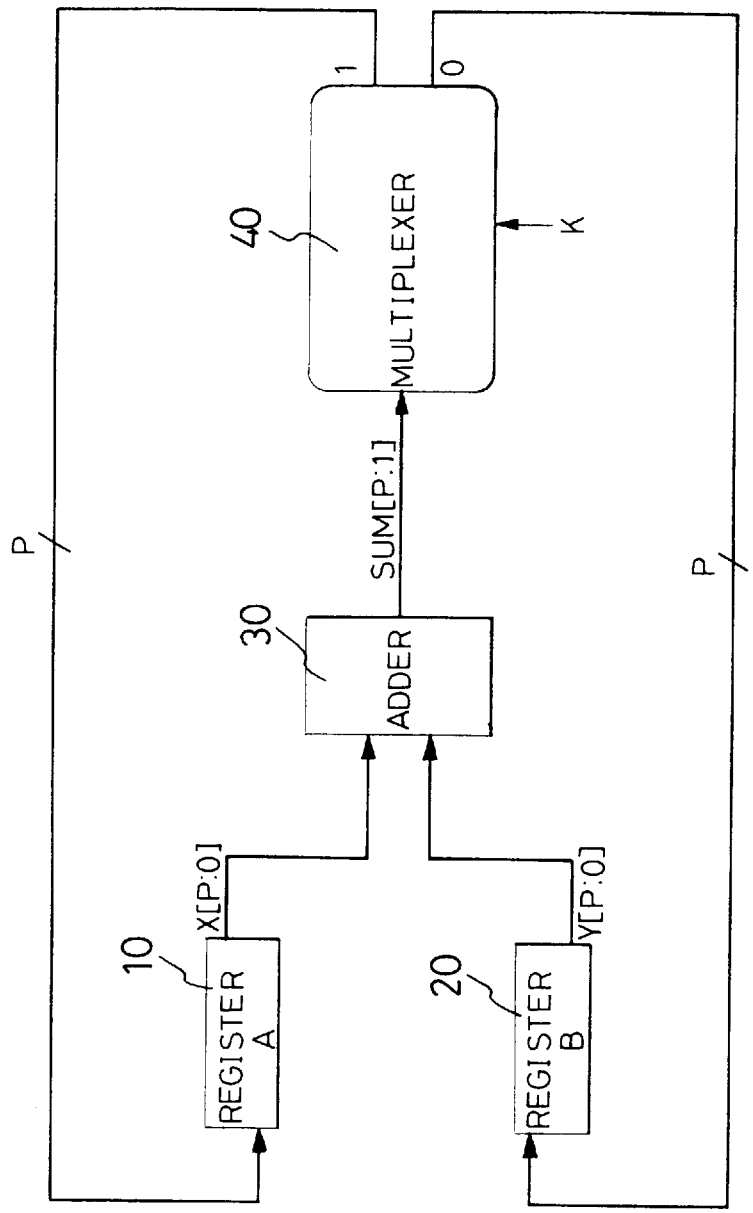
FIG. 2 is a circuit diagram showing an operation flow of a hardware apparatus in accordance with the present invention.

The hardware apparatus of the present invention will be now explained hereinafter. FIG. 2 shows a hardware apparatus of the present invention including two registers A and B, 10 and 20, an adder 30, and a multiplexer 40. Two existing values of two given points X and Y intended to proceed the linear interpolation operation are stored in the register A 10 and the register B 20 respectively. The two values stored in the two registers A and B, 10 and 20 are added in the adder 30 and the lowest order bit of the resulting value is discarded to form a mean value of the two. The mean value is then sent to the multiplexer 40 and every bit in the binary representation of the position pointer K will be sent to a selecting input terminal of the multiplexer 40 in sequence from the highest order bit to the lowest order bit. When the highest order bit in the binary representation of the position pointer K sent to the multiplexer 40 is "1", the mean value described above is sent back to the register A 10. Reversely, when the highest order bit in the binary representation of the position pointer K sent to the multiplexer 40 is "0", the mean value is sent back to the register B 20. The addition operation is proceeded in the adder 30 to obtain a new mean value and the if process of storing back the new mean value to either the register A 10 or the register B 20 will be proceeded again in accordance with the digit of the next higher order bit in the binary representation of the position pointer K. The above process is repeated until the lowest order bit in the binary representation of the position pointer K is sent, in the meantime, the final mean value stored in the register A 10 is the interpolation value with the least error.

Every time, the lowest order bit of the resulting value sent from the adder 30 is discarded by the bisection operation, that is, only the integer portion of the sum of the two values stored in the register A 10 and the register B 20 is stored and the fractional portion of the sum described above is discarded. The maximum error in the binary representation is 0.1111111..., in which the digit 1 with the shortest distance away from the decimal point is the fractional portion discarded by the last one bisection operation and the digit 1 with the greatest distance away from the decimal point is the fractional portion discarded by the first one bisection operation. Therefore, the maximum accumulated error is $\frac{1}{2} + (\frac{1}{2})^2 + (\frac{1}{2})^3 + (\frac{1}{2})^4 + \ldots$, the total sum must be less than 1 when converting to decimal scale.

A preferred embodiment is shown in FIG. 6. Suppose that the distance between a given point X and a given point Y is divided into 32 equal parts and the distance ratio between the position of a target point I and the given point X to the distance between the target point I and the given point Y is 25 to 7, that is, the value of the position pointer K is 25. According to the definition described above, 32 is the 5th power of 2, that is, n equals 5. Accordingly, the relational expression should be the following.

$$I = \frac{(32-25)*X + 25*Y}{32} = \frac{7*X + 25*Y}{32}$$

The operation is carried out through the hardware apparatus shown in FIG. 2 and the resulting values discarded from the lowest order bit being stored in the registers A and B, 10 and 20, every time after the bisection method has been operated are shown in the table of FIG. 6. After the bisection method has been operated 5 times, the integer value stored in the register A 10 is exactly the same as the above expression (7*X+25*Y)/32.

Here, another preferred embodiment is shown in FIG. 7. Suppose that the distance between the given point X and the given point Y is divided into 64 equal parts and the distance ratio between the position of the target point I and the given point X to the distance between the target point I and the given point Y is 19 to 45, that is, the value of the position pointer K is 19. Referring to the previous definition, 64 is the 6th power of 2, that is, n equals 6. Accordingly, the relational expression should be the following.

$$I = \frac{(64-19)*X + 19*Y}{64} = \frac{45*X + 19*Y}{64}$$

Figure 4:
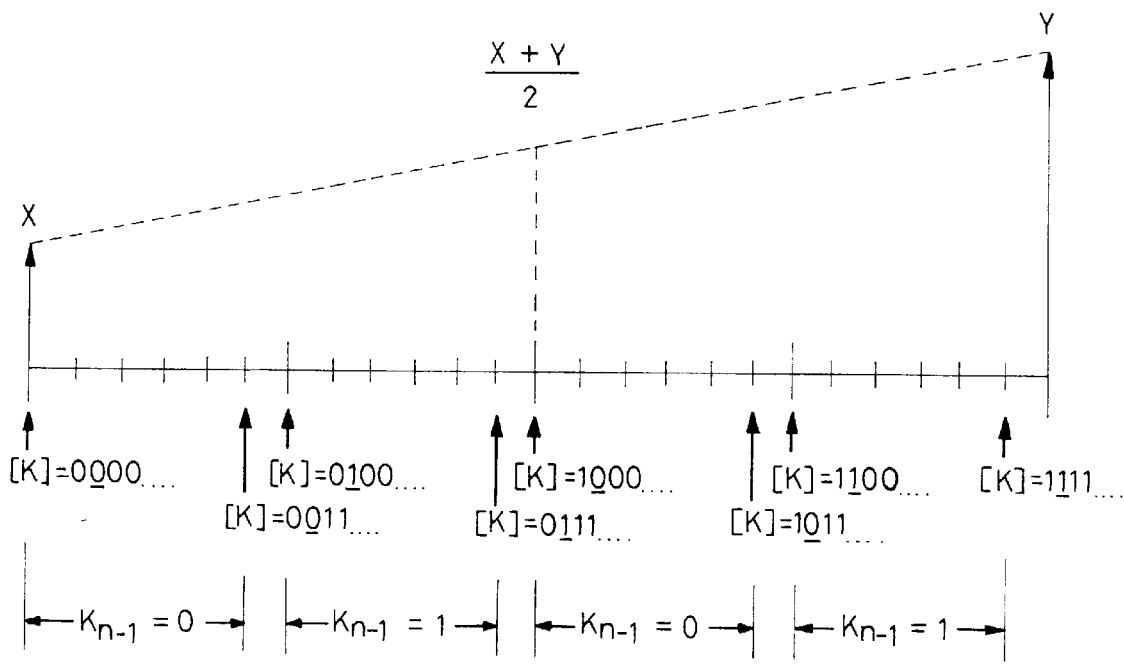
FIG. 4 is a schematic representation of applying a concept of a bisection method to further gradually approach an interpolation value using an interpolation operation in accordance with the present invention.

The operation is carried out through the hardware apparatus shown in FIG. 4 and the values are stored in registers A and B every time after the bisection method has been operated 6 times. The integer value stored in the register A is exactly the same as the intended expression (45*X+19*Y)/64.

Although the invention has been explained in relation to its preferred embodiment, it is to be understood that many other possible modifications and variations can be made without departing from the spirit and scope of the invention as hereinafter claimed.

I claim:

1. A fast calculation method using a linear interpolation operation, the method comprising the steps of:

(a) determining two existing values of two given points X and Y, and a number K regarded as a position pointer of a target point I;

(b) storing said two existing values of said two given points X and Y intended to proceed said linear interpolation operation;

(c) adding said two existing values of said two given points X and Y and discarding the lowest order bit of the resulting value;

(d) selectively substituting said resulting value discarded from the lowest order bit for one of said two values of said two given points X and Y in accordance with the highest order bit in a binary representation of said position pointer K;

(e) repeating said two steps (c) and (d), sequentially selecting a next highest order bit in the binary representation of said position pointer K until the lowest order bit in said binary representation of said position pointer K is used; and (f) achieving an interpolation value of said target point I from one of said two resulting values discarded from the lowest order bit of said two given points X and Y.

2. The fast calculation method as recited in claim 1, further comprising a step for substitution depending on the larger difference in comparing the difference between said resulting value discarded from the lowest order bit and said value of said given point X to the difference between said resulting value discarded from the lowest order bit and said value of said given point Y.

3. A hardware apparatus using a linear interpolation operation, the hardware apparatus comprising:

two register provided to store two existing values of two given points X and Y intended to proceed said linear interpolation operation respectively;

an adder provided to add said two existing values coming from said two registers and to discard the lowest bit of a resulting value to form a mean value;

a multiplexer provided to selectively substitute said mean value coming from said adder for one of said two existing values of said two registers according to the digit of the highest order bit in a binary representation of a number K regarded as a position pointer of a target point I;

wherein the interpolation value of said target point I is one of the two resulting values discarded from the lowest order bit stored in said two registers after a process had been repeated, sequentially selecting a next highest order bit in the binary representation of said position pointer K, until the lowest order bit in said binary representation of said position pointer K is used.

4. The hardware apparatus as recited in claim 3, wherein every bit in said binary representation of said position pointer K is sent to a selecting input terminal of said multiplexer in sequence.

5. The hardware apparatus as recited in claim 3, wherein when said digit of the corresponding bit in said binary representation of said position pointer K is "1", said resulting value discarded from the lowest order bit is sent back to said register originally storing said existing value of said given point Y and when said digit of the corresponding bit in said binary representation of said position pointer K is "0", said resulting value discarded from the lowest order bit is sent to back to said register originally storing said existing value of said given point X, and said interpolation value of said target point I is substantially the final resulting value discarded from the lowest order bit stored in said register originally storing said existing value of said given point Y.

6. The hardware apparatus as recited in claim 3, wherein when said digit of the corresponding bit in said binary representation of said position pointer K is "1", said resulting value discarded from the lowest order bit is sent back to said register originally storing said existing value of said given point X and when said digit of the corresponding bit in said binary representation of said position pointer K is "0", said resulting value discarded from the lowest order bit is sent back to said register originally storing said existing value of said given point Y, and said interpolation value of said target point I substantially is the final resulting value discarded from the lowest order bit originally storing said existing value of said given point X.

7. The hardware apparatus as recited in claim 3, wherein said adder is in a form of series addition with one bit.

8. The hardware apparatus as recited in claim 3, wherein said adder is in a form of parallel addition with multiple bits.

9. The hardware apparatus as recited in claim 3, wherein said two registers have the same bit number.

10. The hardware apparatus as recited in claim 3, wherein the difference between said two existing values of said two given points X and Y is divided into the n-th power of 2 equal parts.

11. The hardware apparatus as recited in claim 3, wherein the accumulated error is substantially less than 1.

* * * * *